United States Patent [19]
Wilhelm et al.

[11] Patent Number: 5,118,566
[45] Date of Patent: Jun. 2, 1992

[54] BIAXIALLY-ORIENTED POLYPROPYLENE FILM WITH HIGH MECHANICAL STRENGTH

[75] Inventors: Thomas Wilhelm, Taunusstein; Lothar Bothe, Mainz-Gonsenheim; Guenther Crass, Taunusstein; Gunter Schloegl, Kelheim; Winfried Muskalla, Eltville, all of Fed. Rep. of Germany

[73] Assignee: Hoechst Aktiengesellschaft, Frankfurt am Main, Fed. Rep. of Germany

[21] Appl. No.: 542,045

[22] Filed: Jun. 22, 1990

[30] Foreign Application Priority Data

Jun. 29, 1989 [DE] Fed. Rep. of Germany ....... 3921358

[51] Int. Cl.⁵ ................................. B32B 7/12
[52] U.S. Cl. .................... 428/339; 428/516; 428/910; 428/349; 524/584; 156/244.11
[58] Field of Search .............. 428/910, 516, 349; 525/240; 524/584; 156/244.11

[56] References Cited

U.S. PATENT DOCUMENTS

3,937,762  2/1976  Nahmias et al. ............. 260/889
4,451,533  5/1984  Wong et al. ................. 428/337
4,567,089  1/1986  Hattori et al. .............. 428/213

FOREIGN PATENT DOCUMENTS

0047634  3/1982  European Pat. Off.
0079520  3/1983  European Pat. Off.

Primary Examiner—Edith L. Buffalow
Attorney, Agent, or Firm—Foley & Lardner

[57] ABSTRACT

A biaxially-oriented film with high mechanical strength, which includes 69 to 94.99% by weight of a polyolefin, 5 to 30% by weight of a natural or synthetic resin having a softening point in the range from 70° to 170° C., and 0.01 to 1% by weight of a nucleating agent, based on the total weight of the film. A method for producing this film includes biaxially drawing the film at temperatures below the melting point of the polyolefin.

20 Claims, No Drawings

BIAXIALLY-ORIENTED POLYPROPYLENE FILM WITH HIGH MECHANICAL STRENGTH

BACKGROUND OF THE INVENTION

The present invention relates to a biaxially-oriented polypropylene film having a high mechanical strength and to its use, especially as a base film for adhesive tapes. The film prepared in accordance with the present invention can be in the form of a monolayer or a multilayer film.

Adhesive tapes with base films of polypropylene are known in the art and have been described in the literature. However, the mechanical properties of the biaxially-oriented polypropylene films which are now conventionally used in this field do not meet the requirements for all applications of adhesive tapes.

Optimization of the mechanical properties of polypropylene base films, particularly an increase of the modulus of elasticity in the longitudinal direction, has always been the subject of intensive efforts, since these mechanical properties are closely related to the film's suitability for technical application and thus directly determine the processing characteristics.

Attempts to solve this problem, which have been described in the literature, comprise solutions based on process technology as well as modifications of the raw material, in particular by means of hydrocarbon resins.

One possibility of manufacturing high strength polypropylene films comprises a three-stage or multistage draw process such as described, for example, in EP-B-0 116 457. A manufacturing process of this kind has, however, the disadvantage that it requires additional equipment for the subsequent longitudinal drawing and is consequently very expensive. It is also highly susceptible to interruptions in the production sequence, for example, caused by film ruptures.

As compared with films which have only been biaxially drawn, these subsequently longitudinally drawn films moreover exhibit a markedly increased longitudinal shrinkage which, as a rule, makes it impossible for the films to withstand thermal drying —as is sometimes still employed after the application of adhesive compounds—without developing unwelcome shrink creases.

Modification of the raw materials used for the production of high-strength polypropylene films by means of various hydrocarbon resins is described, for example, in U.S. Pat. No. 3,937,762. Such a modification of raw materials makes it possible to produce polypropylene films, in which mechanical strength in the longitudinal direction may be significantly improved over films comprising unmodified raw materials but does not reach the values obtained with subsequently longitudinally drawn films and in which shrinkage in the longitudinal direction is also relatively high.

Excellent mechanical properties can be achieved by combining a resin addition to the raw material used with a subsequent longitudinal draw process. A corresponding procedure is described in EP-A-0 079 520. Moduli of elasticity in the longitudinal direction of 4,000 to 6,000 N/mm$^2$ are attained. Nevertheless, even this process has the disadvantage of requiring a subsequent longitudinal draw process which is expensive and susceptible to faults.

SUMMARY OF THE INVENTION

It is therefore an object of the present invention to provide a biaxially-oriented polyolefin film having a high mechanical strength in the longitudinal direction which clearly surpasses the values of resin-modified films prepared according to the conventional two-stage draw process and which eliminates the disadvantages associated with a subsequent longitudinal draw process such as technical modification on the production machine, susceptibility to faults caused by frequent film ruptures and high residual shrinkage in the longitudinal direction of the final film.

It is a further object of the present invention to provide an improved adhesive tape made with the polyolefin film according to the invention.

Another object of the invention resides in the provision of an improved method for producing the polyolefin film and the resulting adhesive tape.

In accomplishing the foregoing objects, there is provided according to one aspect of the present invention a biaxially-oriented film comprising from about 69 to 94.99% of a polyolefin, about 5 to 30% of a natural or synthetic resin having a softening point in the range of from about 70 to 170° C, and about 0.01 to 1% of a nucleating agent.

There also is provided according to the present invention an adhesive tape comprising a base film of the above-described biaxially-oriented film and at least one covering layer disposed on at least one surface of said base film.

A method for producing the film according to the present invention comprises extruding the abovedescribed mixture to form a melt, cooling said melt to form a polymer sheet and subsequently biaxially drawing said sheet at temperatures below the melting point of said polyolefin. A further stretching step is not required, which is important when a heating step is employed to dry the adhesive tape during manufacture.

Further objects, features and advantages of the present invention will become apparent from the detailed description of preferred embodiments that follows.

DETAILED DESCRIPTION OF THE PREFERRED EMBODIMENTS

The polyolefin component comprises, in general, an isotactic polypropylene having an isotacticity exceeding 92%, as determined with the aid of 13-C-NMR spectroscopy. It is, however, also possible to use block copolymers or random copolymers of propylene or a mixture of polypropylene with other alpha-olefins.

The resins added preferably comprise a nonhydrogenated styrene polymer, a methylstyrene styrene copolymer, a pentadiene or cyclopentadiene copolymer, an alpha- or beta-pinene polymer, colophony or colophony derivatives as well as terpene polymers and hydrogenated compounds thereof or a hydrogenated alpha-methylstyrene vinyltoluene copolymer. Mixtures of various of these resins also may be used.

As the nucleating agents substances are employed, by which the crystallization half-time ($t_{\frac{1}{2}}$), as determined by differential scanning calorimetry, is significantly reduced, i.e., in general, by at least 25%. The crystallization half time ($t_{\frac{1}{2}}$) is usually determined under isothermal crystallization conditions at 125° C.

Nucleating agents of this kind may comprise organic substances, preferably dibenzylidene sorbitol or chemically-modified derivatives of dibenzylidene sorbitol, or sodium-bis-(4-tert butylphenyl)phosphate. Further nucleating agents which may be used are, for example, metal salts of benzoic acid, preferably sodium benzoate, as well as quinacridone and quinacridone derivatives.

It is also possible to use inorganic nucleating agents, such as talcum, silicon dioxide or bentonite. In this case it is important for the nucleating agent to be present in extremely fine distribution.

The present invention also includes the use of a combination of two or more different nucleating agents.

The film according to the present invention is prepared in a two-stage draw process. In this process, the polymer or the mixture of raw materials of the invention is plastified and compressed in an extruder. The melt is then extruded through a flat sheet die and brought into contact with a cooling cylinder. The polymer sheet so produced is thereafter biaxially drawn, i.e., longitudinally and transversely with respect to the direction of extrusion, at temperatures below the melting point of the polypropylene used, the draw ratio in the longitudinal direction being at least about 6 and the product of the longitudinal and transverse draw ratios being at least about 40 and maximally about 72.

The film may have any predetermined thickness; however, thicknesses of about 8 to 50 μm, in particular about 15 to 40 μm, have proved to be particularly useful in the intended field of application.

Another embodiment of the present invention is a film comprising a base layer formed of the above-described combination of raw materials and, additionally, one or two covering layers which do not necessarily contain an addition of hydrocarbon resins and/or nucleating agents. Such a film can be prepared without difficulty, for example, by coextrusion. Covering layers of this kind can impart to the film, for example, heat sealability, improved anchoring of an adhesive, or good processing characteristics in high-speed processing machines. The covering layers also may be modified by adding suitable anti-blocking agents and/or antistatic agents.

The film preferably is used as a base film for adhesive tapes, but it is also employed for other purposes, for example, as a packaging material.

The invention is further illustrated by the examples which follow.

The polyolefin component employed was, in all examples given, a polypropylene homopolymer (PP) having an isotactic fraction of about 96% and an $MFI_{230/2.16}$ (DIN 53 735) of about 2 to 3 g/10 minutes. In the cases described, the resin component was a hydrogenated polycyclopentadiene resin having a softening point of 140° C., as determined according to ASTM E-28, and a molecular weight $M_n$ of 500 g/mol. As the nucleating agent dibenzylidene sorbitol was used. The respective raw material mixtures were prepared in a twin-screw kneader.

SERIES NO. 1

Mixture sof the components specified below were extruded, longitudinally drawn by a factor of 6 and then transversely drawn, normal to the longitudianl direction, such that the product of the longitudinal and transverse draw ratios was 50.

|  | Formulation | | Modulus of Elasticity (longit.) N/mm2 | Tension at 10% Elongation (longit.) N/mm2 | Shrinkage % |
|---|---|---|---|---|---|
| Example 1 | 79.9% 20% 0.1% | PP resin nucleating agent | 3,480 | 65 | 5.7 |
| Example 2 | 79.75% 20% 0.25% | PP resin nucleating agent | 3,560 | 68 | 4.9 |
| Comparative Example 1 | 80% 20% | PP resin | 3,250 | 62 | 4.5 |
| Comparative Example 2 | 100% | PP | 2,270 | 50 | 2.3 |

SERIES NO. 2

Mixtures of the components specified below were extruded, longitudinally drawn by a factor of 7 and then transversely drawn, normal to the longitudinal direction, such that the product of the longitudinal and transverse draw ratios was 59.

|  | Formulation | | Modulus of Elasticity (longit.) N/mm2 | Tension at 10% Elongation (longit.) N/mm2 | Shrinkage % |
|---|---|---|---|---|---|
| Example 3 | 79.9% 20% 0.1% | PP resin nucleating agent | 3,930 | 83 | 5.9 |
| Example 4 | 79.75% 20% 0.25% | PP resin nucleating agent | 3,910 | 84 | 5.6 |
| Comparative Example 3 | 80% 20% | PP resin | 3,690 | 78 | 5.3 |
| Comparative Example 4 | 100% | PP | 2,600 | 64 | 2.7 |

SERIES NO. 3

Mixtures of the components specified below were extruded, longitudinally drawn by a factor of 8 and then transversely drawn, normal to the longitudinal direction, such that the product of the longitudinal and transverse draw ratios was 67.

|  | Formulation | | Modulus of Elasticity (longit.) N/mm2 | Tension at 10% Elongation (longit.) N/mm2 | Shrinkage % |
|---|---|---|---|---|---|
| Exam- | 79.9% | PP | 4,510 | 110 | 7.0 |

-continued

| | Formulation | Modulus of Elasticity (longit.) N/mm2 | Tension at 10% Elongation (longit.) N/mm2 | Shrinkage % |
|---|---|---|---|---|
| ple 5 | 20% resin 0.1% nucleating agent | | | |
| Example 6 | 79.75% PP 20% resin 0.25% nucleating agent | 4.460 | 107 | 7.2 |
| Comparative Example 5 | 80% PP 20% resin | 4,100 | 100 | 6.9 |
| Comparative Example 6 | 100% PP | * | * | * |

*Under the above-indicated draw conditions, oriented film could no longer be prepared from unmodified polypropylene, since the latter gave rise to film ruptures.

For measuring the values given in the tables above test strips were prepared which had a width of mm.

All forces occurring were related to film cross-section.

1. To determine the modulus of elasticity, the rate of stretching was set at 0.33 mm/s (=10 %/min) for a distance between grips of 200 mm. The test strip was stretched to 0.7% elongation.

2. To determine the tension at 10% elongation, the rate of stretching was set at 1.66 mm/s (=100 %/min) for a distance between grips of 100 mm. The test strip was stretched to 10% elongation.

3. Shrinkage was measured by placing the film in a circulating air oven and subjecting it to an air temperature of 120° C. for a period of 15 minutes. The percentages given relate to shrinkage of the film in the longitudinal direction.

What is claimed is:

1. A biaxially-oriented film comprising
   about 69 to 94.99% by weight of a polyolefin.
   about 5 to 30% by weight of a natural or synthetic resin having a softening point in the range from about 70° to 170° C., and
   about 0.01 to 1% by weight of a nucleating agent, based on the total weight of the film.

2. A film as recited in claim 1, wherein said polyolefin comprises a polypropylene.

3. A film as recited in claim 2, wherein said polypropylene has an isotactic fraction of more than about 92%.

4. A film as recited in claim 1, wherein said resin comprises at least one member selected from the group consisting of a non-hydrogenated styrene polymer, a methylstyrene-styrene copolymer, a pentadiene or cyclopentadiene copolymer, an alpha-or beta-pinene polymer, a colophony or colophony derivative, a terpene polymer or a hydrogenated compound thereof, and a hydrogenated alpha-methylstyrene-vinyltoluene copolymer.

5. A film as recited in claim 1, wherein said nucleating agent comprises a substance which reduces the crystallization half-time ($t_{\frac{1}{2}}$) by at least 25%, as determined by differential scanning calorimetry.

6. A film as recited in claim 5, wherein said nucleating agent comprises at least one organic substance selected from the group consisting of a dibenzylidene sorbitol or a chemically-modified derivative of dibenzylidene sorbitol, a sodium-bis (4-tert-butylphenyl)phosphate, a metal salt of benzoic acid and a quinacridone or a quinacridone derivative.

7. A film as recited in claim 5, wherein said nucleating agent comprises at least one inorganic substance selected from the group consisting of talcum, silicon dioxide and bentonite.

8. A film as recited in claim 1, wherein said film has a thickness from about 8 to 50 μm.

9. A film as recited in claim 8, wherein said film has a thickness from about 15 to 40 μm.

10. A film as recited in claim 1, further comprising at least one covering layer disposed on at least one surface of said film.

11. A film as recited in claim 10, wherein said covering layers include at least one component selected from the group consisting of an anti blocking agent and an antistatic agent.

12. An adhesive tape having a base film comprised of a film according to claim 1 and at least one adhesive layer applied to the base film.

13. A film as recited in claim 1, produced by a method consisting essentially of the steps of:
   (a) extruding a mixture comprising said polyolefin, said natural or synthetic resin having a softening point in the range from abut 70° to 170° C. and said nucleating agent to form a melt;
   (b) cooling said melt to form a polymer sheet; and subsequently
   (c) biaxially drawing said sheet at temperatures below the melting point of said polyolefin.

14. A film as recited in claim 13, wherein step (c) comprises longitudinally drawing said sheet by a factor of at least about 6 and then transversely drawing said sheet such that the product of the longitudinal and transverse draw rations is from about 40 to 72.

15. A film as recited in claim 13, wherein said method further comprises the steps of applying an adhesive layer on at least one side of said film and thereafter heating the film to dry said adhesive layer.

16. A film as recited in claim 3, wherein said polypropylene is a homopolymer.

17. A film as recited in claim 2, wherein said polypropylene comprises a bock or random copolymer.

18. A packaging material comprising a film as claimed in claim 1.

19. A film as recited in claim 2, wherein said resin comprises hydrogenated polycyclopentadiene and said nucleating agent comprises dibenzylidene sorbitol.

20. A film as recited in claim 2, consisting essentially of said polypropylene, said resin, and said nucleating agent.

* * * * *